(12) United States Patent
Cheng et al.

(10) Patent No.: US 12,483,237 B2
(45) Date of Patent: Nov. 25, 2025

(54) POWER-UP INITIALIZATION CIRCUIT

(71) Applicant: MEDIATEK INC., Hsin-Chu (TW)

(72) Inventors: Lik T. Cheng, San Jose, CA (US);
Zijie Guo, San Jose, CA (US); Agastya Gogoi, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 103 days.

(21) Appl. No.: 18/500,140

(22) Filed: Nov. 2, 2023

(65) Prior Publication Data

US 2024/0178821 A1 May 30, 2024

Related U.S. Application Data

(60) Provisional application No. 63/384,956, filed on Nov. 24, 2022.

(51) Int. Cl.
*H03K 17/22* (2006.01)
*H03K 3/037* (2006.01)
*H03K 5/133* (2014.01)
*H03K 5/00* (2006.01)

(52) U.S. Cl.
CPC ........... *H03K 17/22* (2013.01); *H03K 3/0375* (2013.01); *H03K 5/133* (2013.01); *H03K 2005/0015* (2013.01)

(58) Field of Classification Search
CPC ...... H03K 3/0375; H03K 5/133; H03K 5/134; H03K 2005/0015; H03K 17/20; H03K 17/22; H03K 17/223
USPC ................ 327/198, 261, 284, 285, 288, 290
See application file for complete search history.

(56) References Cited

U.S. PATENT DOCUMENTS

| | | | | |
|---|---|---|---|---|
| 3,950,654 | A | * 4/1976 | Broedner | H03K 19/09443 327/143 |
| 4,611,126 | A | * 9/1986 | Miller | G06F 1/28 307/64 |
| 5,180,926 | A | 1/1993 | Skripek | |
| 5,365,481 | A | * 11/1994 | Sawada | G11C 29/46 365/194 |
| 6,078,201 | A | * 6/2000 | Crotty | H03K 17/223 327/143 |
| 6,160,431 | A | 12/2000 | Crotty | |
| 7,276,941 | B2 | 10/2007 | Jang | |
| 8,035,426 | B1 | 10/2011 | Ecker | |
| 9,654,096 | B1 | 5/2017 | Wadhwa | |
| 2009/0267659 | A1* | 10/2009 | Li | H03K 17/22 327/143 |

(Continued)

FOREIGN PATENT DOCUMENTS

EP 3 748 853 A1 12/2020
KR 2000-0018500 A 4/2000

(Continued)

*Primary Examiner* — William Hernandez
(74) *Attorney, Agent, or Firm* — Winston Hsu

(57) ABSTRACT

A power-up initialization circuit includes a delay chain circuit and a signal generator circuit. The delay chain circuit receives a power supply voltage, and applies a predetermined delay amount to the power supply voltage for generating a delayed output voltage. The signal generator circuit receives the delayed output voltage from the delay chain circuit, and generates and outputs at least one power-up initialization signal in response to the delayed output voltage.

18 Claims, 3 Drawing Sheets

(56) References Cited

U.S. PATENT DOCUMENTS

2014/0035634 A1 2/2014 Shrivastava
2019/0086451 A1* 3/2019 Li .................... G01R 19/16576

FOREIGN PATENT DOCUMENTS

KR 2003-0052365 A 6/2003
WO 2007/036019 A1 4/2007

* cited by examiner

POWER-UP INITIALIZATION CIRCUIT

CROSS REFERENCE TO RELATED APPLICATIONS

This application claims the benefit of U.S. Provisional Application No. 63/384,956, filed on Nov. 24, 2022. The content of the application is incorporated herein by reference.

BACKGROUND

The present invention relates to power-up initialization, and more particularly, to a process variation independent power-up initialization circuit that generates a power-up initialization signal with a self-shut-off pulse and an associated power-up initialization method.

For many integrated circuits, it is important that the circuitry on the chip is in a known state after the chip powers up. Failure to power up in a predictable state can make such an integrated circuit fail to function normally. For example, digital circuits (e.g., memories and processors) typically need to initialize all internal resources (e.g., latches, flip-flops, and registers), the state of pipelines, the floating-point state and the state of special purpose processors to defined states when powered up. However, traditional power-up initialization circuits are prone to process variation that may cause power-up initialization function failure, and need re-optimization when ported to new technology nodes. Thus, there is a need for an innovative power-up initialization circuit that is process variation independent.

SUMMARY

One of the objectives of the claimed invention is to provide a process variation independent power-up initialization circuit that generates a power-up initialization signal with a self-shut-off pulse and an associated power-up initialization method.

According to a first aspect of the present invention, an exemplary power-up initialization circuit is disclosed. The exemplary power-up initialization circuit includes a delay chain circuit and a signal generator circuit. The delay chain circuit is arranged to receive a power supply voltage and apply a predetermined delay amount to the power supply voltage for generating a delayed output voltage. The signal generator circuit is arranged to receive the delayed output voltage from the delay chain circuit, and generate and output at least one power-up initialization signal in response to the delayed output voltage.

According to a second aspect of the present invention, an exemplary power-up initialization method is disclosed. The exemplary power-up initialization method includes: applying, by a delay chain circuit, a predetermined delay amount to a power supply voltage for generating a delayed output voltage; and generating and outputting at least one power-up initialization signal in response to the delayed output voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
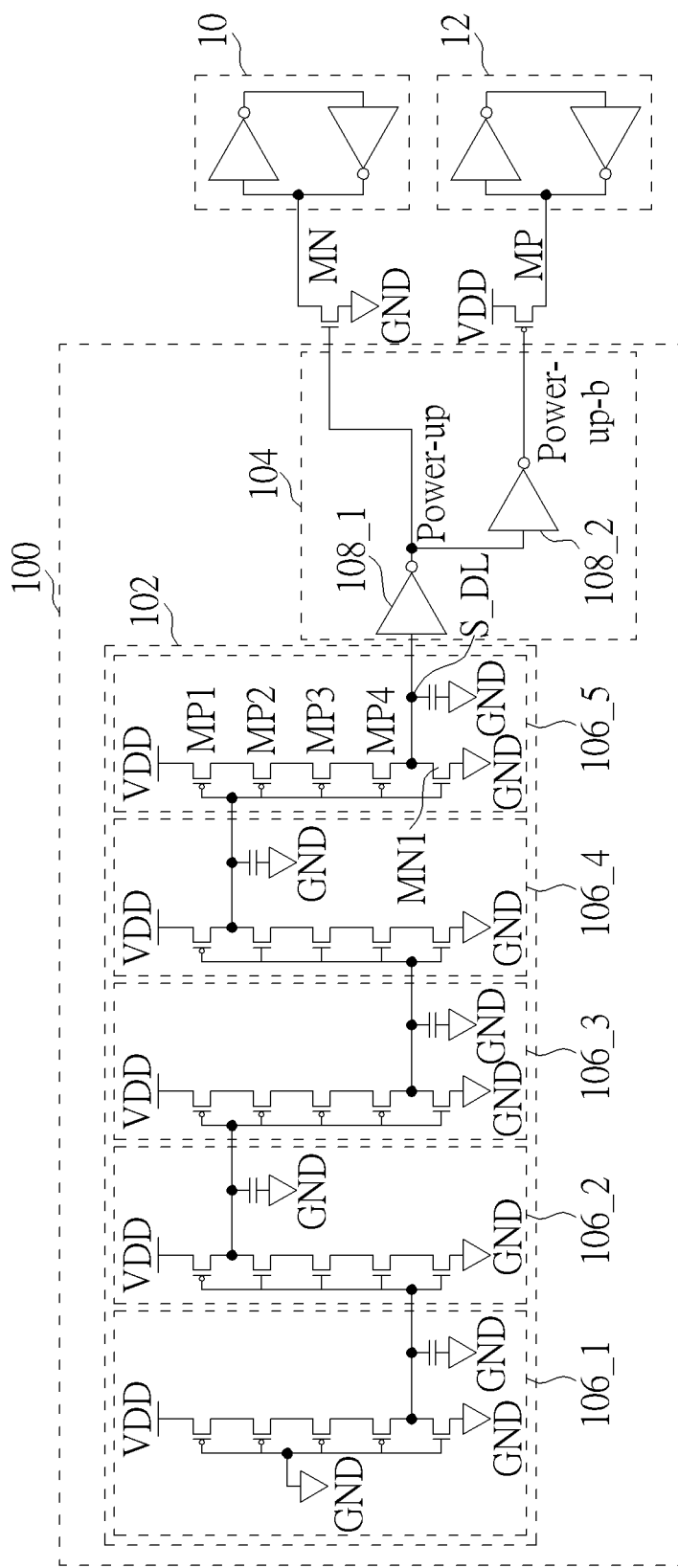
FIG. 1 is a diagram illustrating a power-up initialization circuit according to an embodiment of the present invention.

FIG. 1 is a diagram illustrating a power-up initialization circuit according to an embodiment of the present invention. The power-up initialization circuit 100 may act as a power-up reset circuit or a power-up pre-set circuit. As shown in FIG. 1, the power-up initialization circuit 100 includes a delay chain circuit 102 and a signal generator circuit 104. The delay chain circuit 102 is arranged to receive a power supply voltage VDD from a power rail, and apply a predetermined delay amount to the power supply voltage VDD for generating a delayed output voltage S_DL. In this embodiment, the delay chain circuit 102 is implemented using a plurality of serially connected resistive-capacitive (RC) delay stages 106_1, 106_2, 106_3, 106_4, and 106_5, where the predetermined delay amount between the power supply voltage VDD received by the first RC stage 106_1 and the delayed output voltage S_DL output from the last RC stage 106_5 is defined by the serially connected RC stages 106_1-106_5. It should be noted that the predetermined delay amount depends on the number of RC delay stages. Hence, the number of RC delay stages implemented in the delay chain circuit 102 may be adjusted, depending upon actual design considerations.

In this embodiment, the signal generator circuit 104 is arranged to receive the delayed output voltage S_DL from the delay chain circuit 102 (particularly, the last RC stage 106_5 of the delay chain circuit 102), and generate and output at least one power-up initialization signal in response to the delayed output voltage S_DL. For example, the power-up initialization signal (s) may act as power-up reset signal (s) or power-up pre-set signal (s) for latches, flip-flops, and/or registers on a chip. In this embodiment, the signal generator circuit 104 may include two inverter circuits 108_1 and 108_2. The inverter circuit 108_1 is arranged to receive the delayed output voltage S_DL, and generate and output one power-up initialization signal Power-up according to the delayed output voltage S_DL. More specifically, the delayed output voltage S_DL is an inverse version of the power-up initialization signal Power-up (i.e., Power-up=$\overline{S\_DL}$). The inverter circuit 108_2 is arranged to receive the power-up initialization signal Power-up, and generate and output another power-up initialization signal Power-up-b according to the power-up initialization signal Power-up. More specifically, the power-up initialization signal Power-up-b is an inverse version of the power-up initialization signal Power-up (i.e., Power-up-b=Power-up).

In this embodiment, the power-up initialization signal Power-up may act as an enable signal of a pre-set circuit MN, and the power-up initialization signal Power-up-b may act as an enable signal of a pre-set circuit MP. For example, the pre-set circuit MN may be implemented using an N-channel metal-oxide-semiconductor (NMOS) transistor, and the pre-set circuit MP may be implemented using a P-channel metal-oxide-semiconductor (PMOS) transistor. When the pre-set circuit MN is enabled (turned on) by the power-up initialization signal Power-up, a latch circuit 10 can be pre-set to a defined state. When the pre-set circuit MP is enabled (turned on) by the power-up initialization signal Power-up-b, a latch circuit 12 can be pre-set to a defined state.

When a chip is powered on, the power supply voltage VDD ramps up from a ground voltage GND, and then reaches a stable level controlled by a voltage regulator such as a buck converter. The delayed output voltage S_DL is a delayed version of the power supply voltage VDD. Hence, the delayed output voltage S_DL also ramps up from the ground voltage GND. Before the delayed output voltage S_DL reaches a trip point of the inverter circuit 108_1, the pre-set circuit MN is enabled (turned on) by the power-up initialization signal Power-up. After the delayed output voltage S_DL reaches the trip point of the inverter circuit 108_1, the power-up initialization signal Power-up is pulled low by the inverter circuit 108_1 and disables (turns off) the pre-set circuit MN. It should be noted that the power-up initialization circuit 100 is capable of shutting off the power-up initialization signal Power-up by itself. Specifically, the power-up initialization signal Power-up generated from the power-up initialization circuit 100 has a self-shut-off pulse whose pulse width Td depends on the number of RC stages implemented in the delay chain circuit 102, as illustrated in FIG. 2.

Similarly, before the delayed output voltage S_DL reaches the trip point of the inverter circuit 108_1, the pre-set circuit MP is enabled (turned on) by the power-up initialization signal Power-up-b (which is an inverse version of the power-up initialization signal Power-up). After the delayed output voltage S_DL reaches the trip point of the inverter circuit 108_1, the power-up initialization signal Power-up-b is pulled high by the inverter circuit 108_2 and disables (turns off) the pre-set circuit MP. The power-up initialization circuit 100 is capable of shutting off the power-up initialization signal Power-up-b by itself.

Figure 2:
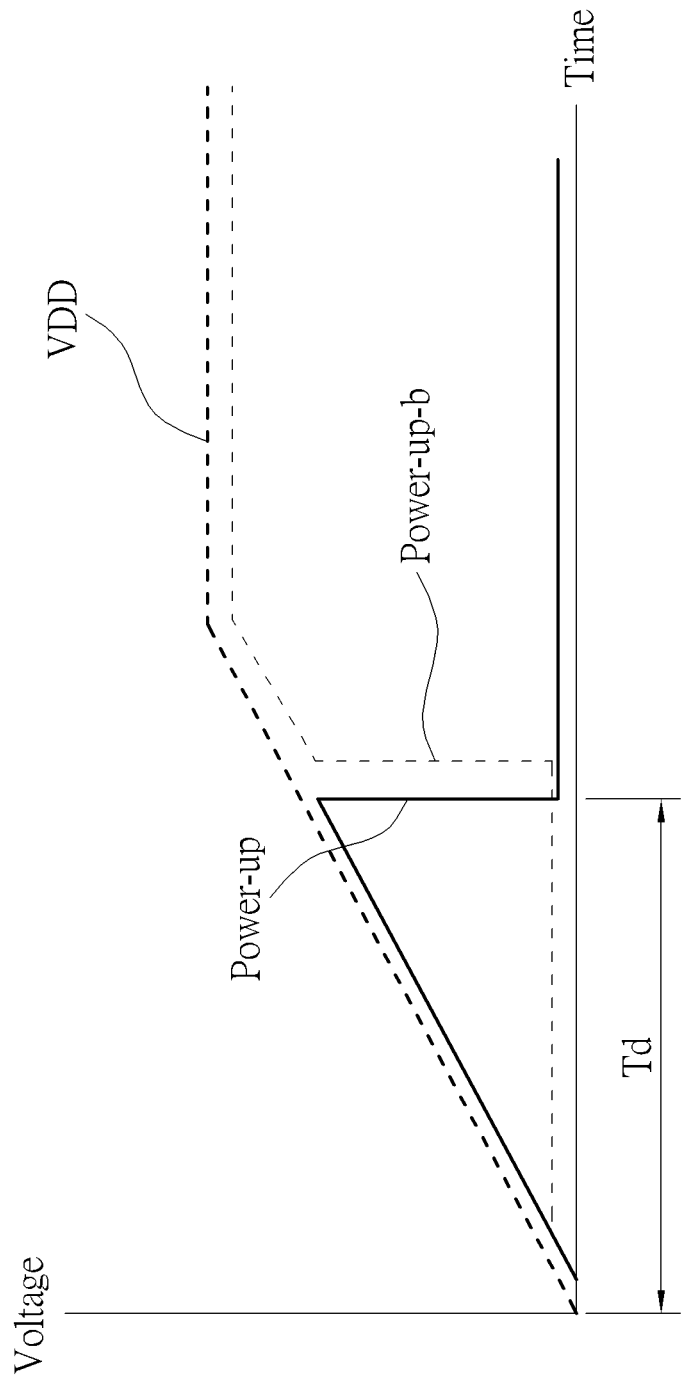
FIG. 2 is a diagram illustrating power-up initialization signals output from the power-up initialization circuit shown in FIG. 1.

As shown in FIG. 2, the timing of shutting off the power-up initialization signal Power-up/Power-up-b is defined by the number of RC stages implemented in the delay chain circuit 102. Since the delay function of the delay chain circuit 102 is not affected by process variation and the power-up initialization circuit 100 works based on a self-shut-off pulse formed and controlled by the delay chain circuit 102, the function of the power-up initialization circuit 100 is process variation independent. Hence, the power-up initialization circuit 100 doesn't need re-optimization when ported to new technology nodes.

Each RC delay stage implemented in the delay chain circuit 102 includes at least one resistive element and at least one capacitive element. In this embodiment, each resistive element may be implemented using a transistor resistor (i.e., MOS resistor), and/or each capacitive element may be implemented using a transistor capacitor (i.e., MOS capacitor). Taking the RC stage 106_5 for example, it includes MOS transistors MP1-MP4 and MN1 and a MOS transistor C. However, this is for illustrative purposes only, and is not meant to be a limitation of the present invention. Alternatively, a resistive element of an RC stage may be implemented using a non-transistor resistor, and/or a capacitive element of the RC stage may be implemented using a non-transistor capacitor.

Figure 3:
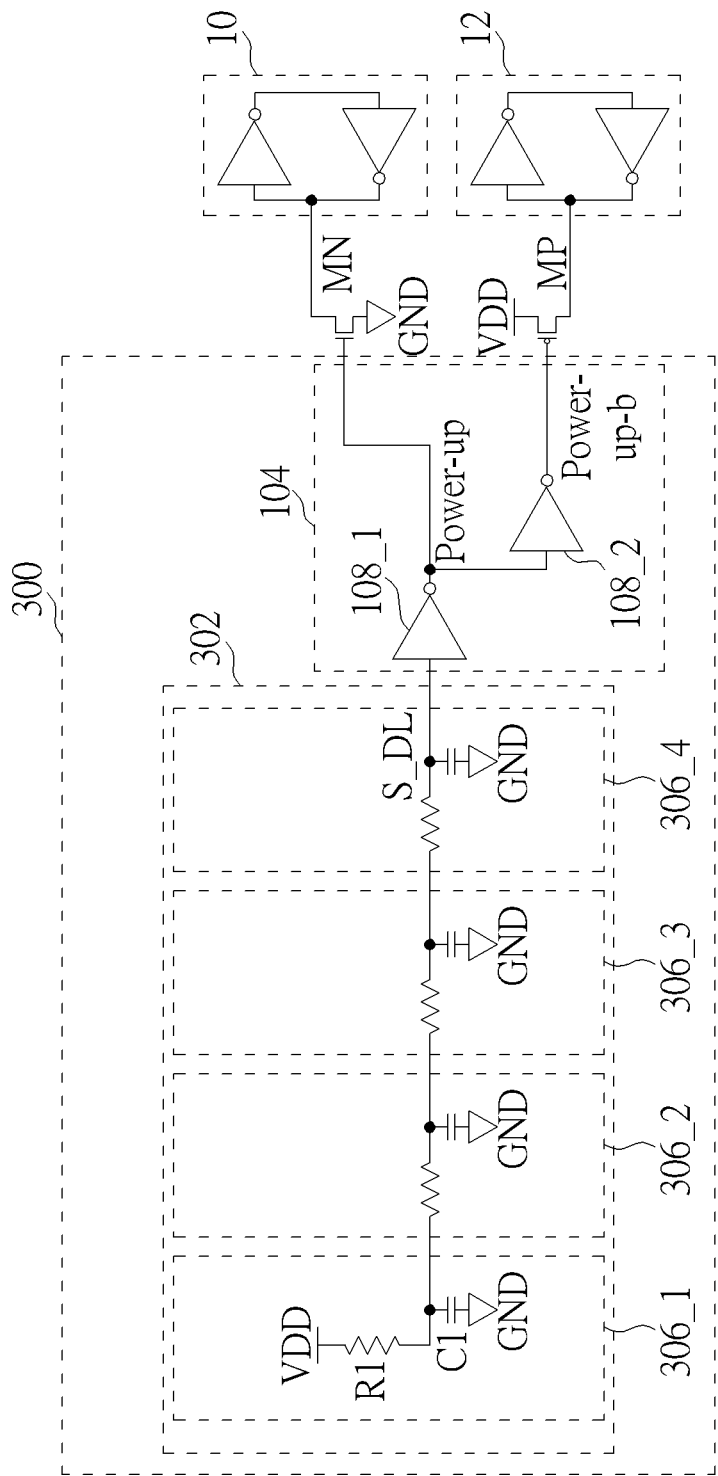
FIG. 3 is a diagram illustrating another power-up initialization circuit according to an embodiment of the present invention.

FIG. 3 is a diagram illustrating another power-up initialization circuit according to an embodiment of the present invention. The power-up initialization circuit 300 may act as a power-up reset circuit or a power-up pre-set circuit. As shown in FIG. 3, the power-up initialization circuit 300 includes a delay chain circuit 302 and the aforementioned signal generator circuit 104. Like the delay chain circuit 102, the delay chain circuit 302 is arranged to receive a power supply voltage VDD from a power rail, and apply a predetermined delay amount to the power supply voltage VDD for generating and outputting the delayed output voltage S_DL to the following signal generator circuit 104. In this embodiment, the delay chain circuit 302 is implemented using a plurality of serially connected RC delay stages 306_1, 306_2, 306_3, and 306_4. The predetermined delay amount depends on the number of RC delay stages. Hence, the number of RC delay stages implemented in the delay chain circuit 302 may be adjusted, depending upon actual design considerations. The difference between the delay chain circuit 102 and 302 is that each resistive element in an RC stage can be implemented using a non-transistor resistor R1 (e.g., metal-layer resistor), and each capacitive element C1 in an RC stage can be implemented using a non-transistor capacitor (e.g., metal-layer capacitor). Since a person skilled in the art can readily understand principles of the power-up initialization scheme employed by the power-up initialization circuit 302 after reading above paragraphs directed to the power-up initialization circuit 102, similar description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-up initialization circuit comprising:
   a delay chain circuit, arranged to receive a power supply voltage and apply a predetermined delay amount to the power supply voltage for generating a delayed output voltage; and
   a signal generator circuit, arranged to receive the delayed output voltage from the delay chain circuit, and generate and output at least one power-up initialization signal in response to the delayed output voltage;
   wherein a function of the power-up initialization circuit is process variation independent.

2. The power-up initialization circuit of claim 1, wherein the delay chain circuit comprises:
   a plurality of serially connected resistive-capacitive (RC) delay stages, each comprising:
      at least one resistive element; and
      at least one capacitive element.

3. The power-up initialization circuit of claim 2, wherein the at least one resistive element comprises at least one transistor resistor.

4. The power-up initialization circuit of claim 2, wherein the at least one capacitive element comprises at least one non-transistor capacitor.

5. The power-up initialization circuit of claim 1, wherein the signal generator circuit comprises:

a first inverter circuit, arranged to receive the delayed output voltage and generate and output a first power-up initialization signal according to the delayed output voltage.

6. A power-up initialization circuit comprising:
a delay chain circuit, arranged to receive a power supply voltage and apply a predetermined delay amount to the power supply voltage for generating a delayed output voltage; and
a signal generator circuit, arranged to receive the delayed output voltage from the delay chain circuit, and generate and output at least one power-up initialization signal in response to the delayed output voltage;
wherein the delay chain circuit comprises:
a plurality of serially connected resistive-capacitive (RC) delay stages, each comprising:
at least one resistive element, wherein the at least one resistive element comprises at least one non-transistor resistor; and
at least one capacitive element.

7. A power-up initialization circuit comprising:
a delay chain circuit, arranged to receive a power supply voltage and apply a predetermined delay amount to the power supply voltage for generating a delayed output voltage; and
a signal generator circuit, arranged to receive the delayed output voltage from the delay chain circuit, and generate and output at least one power-up initialization signal in response to the delayed output voltage;
wherein the delay chain circuit comprises:
a plurality of serially connected resistive-capacitive (RC) delay stages, each comprising:
at least one resistive element; and
at least one capacitive element, wherein the at least one capacitive element comprises at least one transistor capacitor.

8. A power-up initialization circuit comprising:
a delay chain circuit, arranged to receive a power supply voltage and apply a predetermined delay amount to the power supply voltage for generating a delayed output voltage; and
a signal generator circuit, arranged to receive the delayed output voltage from the delay chain circuit, and generate and output at least one power-up initialization signal in response to the delayed output voltage, wherein the signal generator circuit comprises:
a first inverter circuit, arranged to receive the delayed output voltage and generate and output a first power-up initialization signal according to the delayed output voltage; and
a second inverter circuit, arranged to receive the first power-up initialization signal and generate and output a second power-up initialization signal according to the first power-up initialization signal.

9. A power-up initialization circuit comprising:
a delay chain circuit, arranged to receive a power supply voltage and apply a predetermined delay amount to the power supply voltage for generating a delayed output voltage; and
a signal generator circuit, arranged to receive the delayed output voltage from the delay chain circuit, and generate and output at least one power-up initialization signal in response to the delayed output voltage;
wherein the at least one power-up initialization signal has a self-shut-off pulse that is generated during ramping up of the power supply voltage.

10. A power-up initialization method comprising:
applying, by a delay chain circuit, a predetermined delay amount to a power supply voltage for generating a delayed output voltage; and
generating and outputting at least one power-up initialization signal in response to the delayed output voltage;
wherein a function of the power-up initialization method is process variation independent.

11. The power-up initialization method of claim 10, wherein the delay chain circuit comprises:
a plurality of serially connected resistive-capacitive (RC) delay stages, each comprising:
at least one resistive element; and
at least one capacitive element.

12. The power-up initialization method of claim 11, wherein the at least one resistive element comprises at least one transistor resistor.

13. He power-up initialization method of claim 11, wherein the at least one resistive element comprises at least one non-transistor resistor.

14. The power-up initialization method of claim 11, wherein the at least one capacitive element comprises at least one transistor capacitor.

15. The power-up initialization method of claim 11, wherein the at least one capacitive element comprises at least one non-transistor capacitor.

16. The power-up initialization method of claim 10, wherein generating and outputting the at least one power-up initialization signal in response to the delayed output voltage comprises:
generating a first power-up initialization signal by an inverse version of the delayed output voltage.

17. The power-up initialization method of claim 16, wherein generating and outputting the at least one power-up initialization signal in response to the delayed output voltage further comprises:
generating a second power-up initialization signal by an inverse version of the first power-up initialization signal.

18. The power-up initialization method of claim 10, wherein the at least one power-up initialization signal has a self-shut-off pulse that is generated during ramping up of the power supply voltage.

* * * * *